Patented Mar. 11, 1947

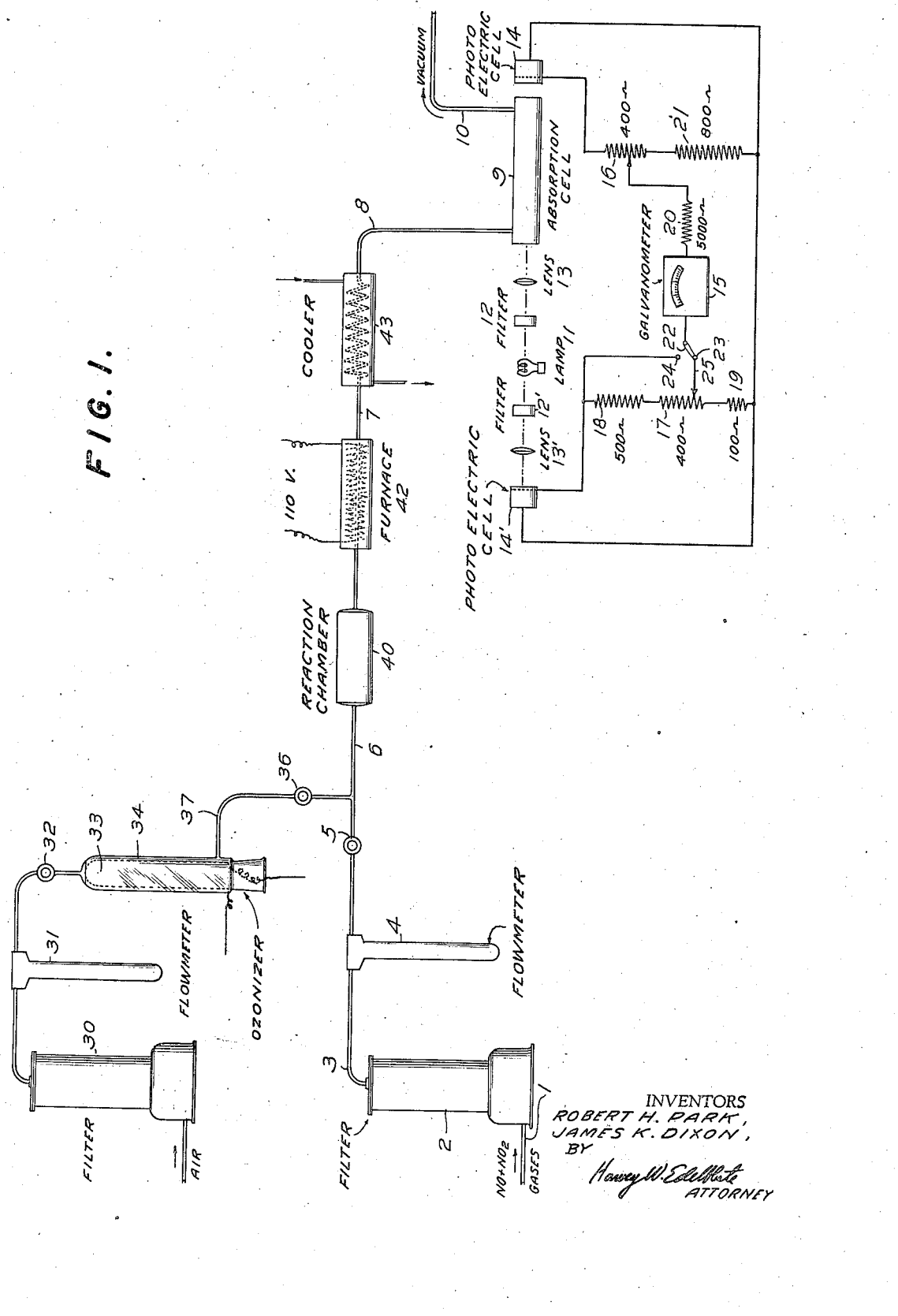

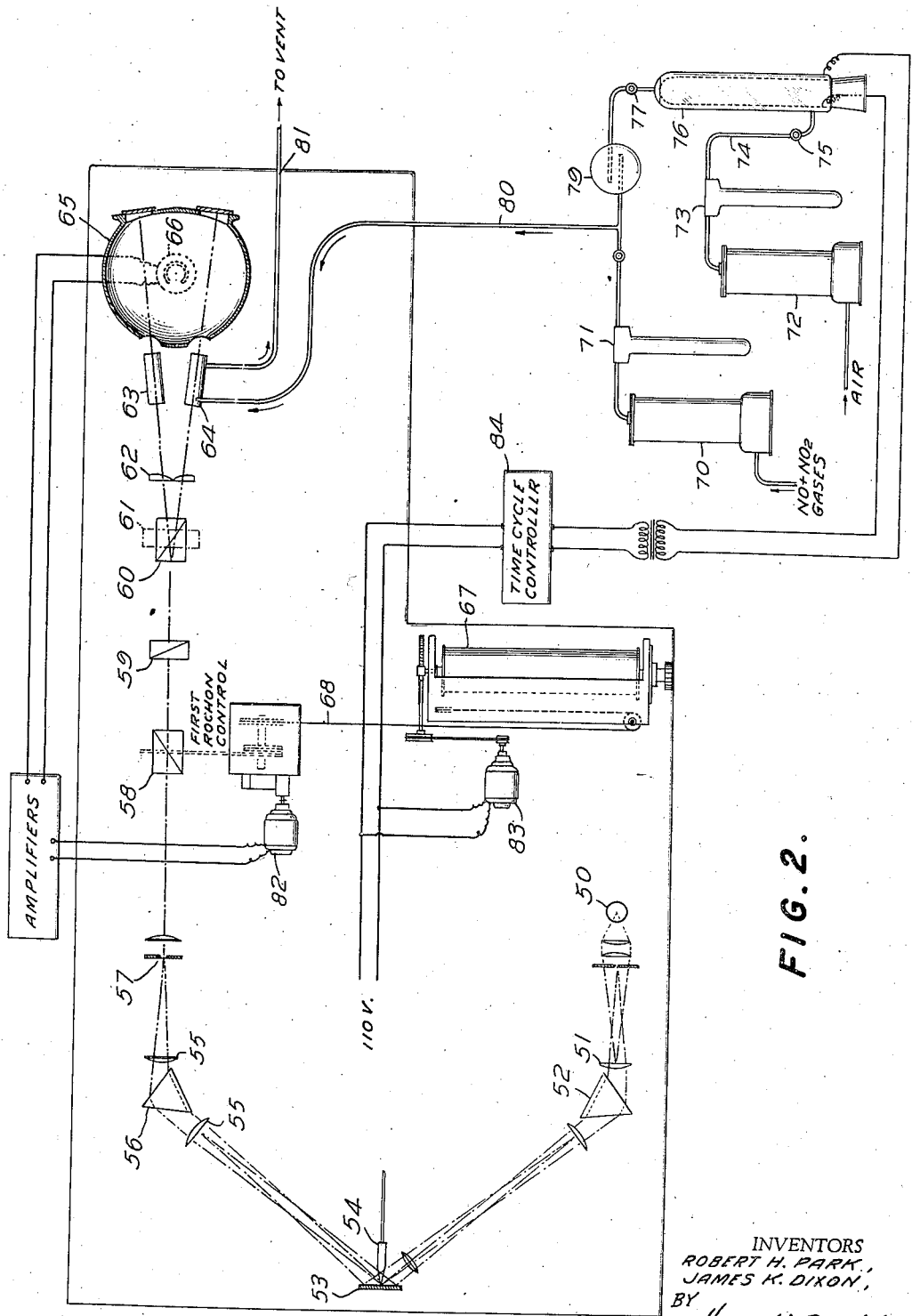

2,417,321

UNITED STATES PATENT OFFICE 2,417,321

ANALYSIS OF NITROUS GASES

Robert H. Park, Washington, D. C., and James K. Dixon, Riverside, Conn., assignors to American Cyanamid Company, New York, N. Y., a corporation of Maine Application November 15, 1941, Serial No. 419,244

7 Claims. (Cl. 23—232)

This invention relates to the analysis of nitrous gases. More particularly, it relates to the determination of nitric oxide (NO), nitric peroxide ($NO_2$), and mixtures thereof, in gaseous atmospheres in which they may be present.

In many chemical operations, such as in the manufacture of nitric acid, nitrites, etc., it is important to know the nitric oxide and nitric peroxide content of the gases employed in the process or being wasted therefrom. Although chemical methods of analysis are available these methods are slow and by the time the results are known the operating conditions of the process may have changed to such an extent that the analytical results obtained no longer show the conditions prevailing in the reaction zone. In such cases it is extremely difficult to control the process intelligently in accordance with scientific principles. The inherent disadvantages of the strictly chemical methods are avoided by the present invention which enables us to make the analysis rapidly and accurately and, if desired, continuously while recording the results automatically.

Our method of analyzing gaseous atmospheres containing NO and $NO_2$, and mixtures thereof, is dependent upon photometric processes, more particularly upon light absorption changes which are caused to take place in the atmosphere by virtue of changes in the chemical composition of the gases. The light absorption values and changes therein are measured photometrically and translated, by means to be presently described, into analytical results.

The fact that $NO_2$ is a yellowish-red vapor under ordinary conditions has led to the suggestion that the concentration of this gas in gaseous mixtures could be determined photometrically. Nitric oxide is a colorless gas, however, and its concentration in a mixture of gases cannot be directly determined by photometric methods. As most industrial processes involving the use of these gases employ mixtures thereof, the relative proportions of which may fluctuate considerably, it is important that the concentration of both NO and $NO_2$ be known since the efficiency of the process may depend upon the quantities and proportions of both. So far as we are aware the rapid and accurate photometric determination of NO and mixtures of both NO and $NO_2$ in gaseous atmospheres has not heretofore been accomplished.

In accordance with the principles of our invention we determine the $NO_2$ content of the gaseous mixture by photometric measurement of the absorption of light by the sample and express the $NO_2$ content of the gas as a function thereof. Since NO which may be present is readily oxidized to $NO_2$, the photometric measurements should be made fairly soon after the sample has been taken. Also $NO_2$ being readily absorbed in water with the formation of $HNO_3$ and NO, lengthy contact with water or water vapor should be avoided.

To determine the concentration of NO in the sample the NO contained therein is oxidized substantially completely to $NO_2$ and the light absorption of the sample then measured photometrically. The difference between the $NO_2$ content characteristic of the photometric value obtained for the original sample, and the corresponding content of the sample after the NO has been oxidized to $NO_2$ provides a measure of the NO concentration of the original sample.

The oxidation of NO to $NO_2$ must be carried out under rather definite conditions. Ordinary oxygen will oxidize NO to $NO_2$ but the oxidation is very slow and therefore cannot be relied upon for oxidizing purposes. The time required for oxidation of NO to $NO_2$ by ordinary oxygen makes it impractical to use this method in rapid analytical work and makes it impossible to control the manufacturing process thereby with any degree of accuracy.

We have found that by employing ozone, which may be obtained by passing air through an ozonizer in known manner, it is possible to oxidize substantially all of the NO to $NO_2$ almost instantly, and the photometric measurement of the sample may be completed in a few seconds. The results thus obtained by our method show the composition of the gases being sampled substantially at the moment of taking the sample.

As ozone is a powerful oxidizing agent an excess of ozone will, after the NO has been oxidized to $NO_2$, continue the oxidation of the $NO_2$ in the gas to $N_2O_5$ which being colorless cannot be photometrically measured. We overcome this difficulty by converting all the fixed nitrogen in the gas sample into $NO_2$ during the measurement of the light absorption of the gas so that a true maximum color value is obtained which expresses the total oxides of nitrogen present in the gas.

Supply of the amount of ozone necessary to oxidize all of the NO to $NO_2$ is accomplished by us by various methods. In one method which will be described in greater detail in connection with Fig. 1 of the drawing we mix a known volume of the gases to be analyzed with a known volume of ozonized air containing at least enough ozone to oxidize all of the NO in the sample to $NO_2$. The oxidation of the NO to $NO_2$ by the ozone takes place almost immediately. Should an excess of ozone be present, however, part of the $NO_2$ is further oxidized to $N_2O_5$. By passing this mixture of gases through a zone heated to temperatures of the order of 250–500° C. the $N_2O_5$ may be decomposed to $NO_2$ and oxygen and the excess ozone decomposed to oxygen. At this point all of the NO originally present in the sample has been oxidized substantially completely to $NO_2$ and the gases may then be cooled to a standard temperature and the light transmission measured photometrically and expressed in terms of its nitrogen peroxide content. When measuring gases substantially free from moisture, or when moisture in the gas has been removed by a suitable dehydrating agent, the light absorption of the ozonized mixture will remain substantially constant and can be measured by the operator by means of the apparatus described in connection with Fig. 1.

Another method of supplying just enough ozone to oxidize all of the NO in the sample to $NO_2$ is described in greater detail in conjunction with Fig. 2. By this method a mixture of air and the gases to be analyzed, in measured proportions, is passed through an absorption cell and the light transmission of the sample measured and recorded continuously. This measurement may be made by proper standardization to express the $NO_2$ content of the gaseous mixture. An electric potential is then applied to the ozonizing apparatus and it commences to supply ozone to the air stream in steadily increasing amounts. As the amount of ozone in the gaseous mixture is at first quite small there will not be enough ozone in the air-gas mixture to oxidize all of the NO to $NO_2$. As the amount of ozone increases the percentage of NO being oxidized to $NO_2$ also increases and the color of the air-gas mixture deepens. At that point at which there is just enough ozone being supplied to oxidize all of the NO to $NO_2$ the air-gas mixture will be at its deepest color. As an excess of ozone is supplied by the ozonizer the excess will be available for oxidizing $NO_2$ to $N_2O_5$ and the color of the air-gas mixture will become lighter. As the photometric values are recorded continuously while the amount of ozone in the gas increases they will be seen to approach a point of maximum light absorption and then fall off. The maximum point on a curve plotted from these values will represent the light transmission of the sample when all of the NO has been oxidized to $NO_2$, or, in other words, the point where just enough ozone has been added to oxidize all of the NO to $NO_2$. From values previously determined by standardization of the apparatus the maximum value thus obtained may be made to express the total $NO_2$ content then in the gas. As the $NO_2$ content of the gas before being subjected to oxidation had been determined a few seconds previously it is a comparatively simple matter to calculate the amount of $NO_2$ developed in the mixture by oxidation and from this the amount of NO originally present in the gas sample.

When an excess of ozone has been generated the ozonizer may then be thrown out of operation. The steadily decreasing amount of ozone in the gaseous mixture again reaches a point at which there is just enough ozone to oxidize all of the NO to $NO_2$. At this point the color of the air-gas mixture will again be at a maximum but again falls away as the amount of ozone becomes progressively less and less.

This latter method of applying the principles of our invention has the advantage that it is not necessary to destroy the excess ozone and $N_2O_5$ in the air-gas mixture by passing it through a furnace. This method of operation is also of advantage in those cases where the gases contain small amounts of water vapor, since the gases pass rapidly through the apparatus and the colorimetric measurement is made substantially instantly with the point at which just enough ozone is present to oxidize all the NO to $NO_2$. Reaction of the $NO_2$ with water vapor is thus reduced to a minimum.

Our invention will now be illustrated in greater detail by means of the drawings, Fig. 1 of which illustrates diagrammatically suitable apparatus for carrying out one modification of our invention and Fig. 2 represents diagrammatically another type of apparatus for applying the principles of our invention in a different manner. It will be understood, however, that our invention in its broader aspects is not limited to the particular modifications shown since obvious changes therein may be made without departing from the scope of the invention set forth in the appended claims.

Referring now to Fig. 1 a sample of the gaseous atmosphere to be analyzed for NO, $NO_2$ or both NO and $NO_2$ is taken through conduit 1 to a filter 2 which may be packed with glass wool or some other non-reactive material effective to filter dust and other foreign objects from the gases. The filter may also contain dehydrating agents such as anhydrous calcium sulfate or phosphoric acid to remove excess moisture which may under certain conditions be present in the gases. The gases are then led from the filter through a conduit 3, flow meter 4, valve 5, conduits 6, 7 and 8 into an absorption cell 9. The various conduits and valves may be constructed of glass, stainless steel or some other material resistant to corrosion by nitric acid. The absorption cell consists essentially of a glass chamber, having plane glass ends transparent to light. The gases are drawn through the system by means of a stainless steel steam ejector, pump or by other suitable means (not shown) attached to conduit 10.

When the gaseous mixture drawn into the absorption cell contains $NO_2$ it will have a pale yellow to reddish-yellow color, the depth of which depends upon the concentration of $NO_2$ present. To measure the concentration of $NO_2$ gas in the atmosphere the absorption of light passing through the cell due to the presence of the $NO_2$ in the gas is measured. This is accomplished by means of the photometric circuit shown in which light from a suitable source, such as a lamp 11 of about 6 candlepower intensity, passes through a blue filter 12, collimating lens 13, through the gases in the absorption cell and on to the active face of a photoelectric cell 14. Light from the same source passes through a similar filter 12′, lens 13′ and onto the sensitive face of a matched photoelectric cell 14′. The light absorption is then measured by means of a galvanometer 15 which forms a part of the circuit shown. This circuit comprises a sensitive galvanometer, the particular one shown having an internal resistance of 1100 ohms, a sensitivity of 0.008 microamp per millimeter and having a critical damping external resistance of 6200 ohms. The circuit also contains two variable resistances 16 and 17 of 400 ohms each and fixed resistances 18, 19, 20 and 21 as shown. The circuit also has a switch 22 with points 23 and 24.

Before measuring the light absorption of the gases in the cell the galvanometer circuit is balanced by placing switch 22 on contact point 24 and while the cell contains nothing but clear air the galvanometer is balanced by the variable resistance 16. With $NO_2$ gas in the absorption cell the switch 22 is placed on contact point 23 and the galvanometer again brought to balance by the variable contact switch 25 by sliding its contact point along the resistance 17. By means of a previous calibration of the apparatus which has been accomplished by placing gases having known quantities of $NO_2$ in the absorption cell and balancing the circuit by the variable switch 25 one may, by knowing the position of the switch 25 when an unknown gas is in the absorption cell, determine from these previously found values the $NO_2$ content of the unknown gaseous atmosphere.

Having determined the $NO_2$ content of the gases under analysis the operator may then determine the NO content of the gas by oxidizing the NO to $NO_2$ and again determining the $NO_2$ content then in the gaseous mixture. To do this a stream of air is passed through a filter 30 similar in construction to the filter previously described, then through a flow meter 31, valve 32 and into an ozonizer 33. The particular ozonizer shown consists essentially of two glass tubes of different diameters having walls about 1 mm. thick and about 48 inches long. The smaller diameter tube fits inside the larger leaving a space between the two glass walls of about 2 mm. The inside of the inner tube and the outside of the outer tube are covered with tin foil or some other electrical conducting means. An electric potential of 5,000–10,000 volts applied across the space between the two tubes causes the formation of ozone when oxygen is passed through the apparatus. As the air is drawn between the walls of the ozonizer 34 a portion of the oxygen therein is converted to ozone. The ozonized air then passes into conduit 37 through valve 36 and into conduit 6. The ozonized air and the nitric oxide containing gas under analysis are caused to mix in line 6 in proportions which may be determined from the rates of flow as shown by the flow meters. The mixed gases then pass into a reaction chamber 40. The purpose of the reaction chamber is to allow complete oxidation of NO to $NO_2$ by the ozone. Experience, however, has shown us that because of the rapidity of the oxidation the reaction space may be very small and in fact if the conduit 6 is of an appreciable length no reaction chamber is necessary.

If just enough ozone is present in the gaseous mixture in the chamber 40 to oxidize all of the NO to $NO_2$ the light absorption of the gaseous mixture may be measured at once. However, it is very difficult to control the amount of ozone generated by the ozonizer and an excess is ordinarily employed. The excess ozone as explained above oxidizes part of the $NO_2$ to $N_2O_5$ which is colorless. The gases are therefore passed through a furnace 42 where they are heated to temperatures between 250–500° F., 350° F. being the preferred temperature. The furnace consists essentially of nothing more than a heat resistant covering for conduit 7, such as an "Alundum" tube, wrapped with "Nichrome" resistance wire and the assembly covered with suitable insulating material. At the high temperatures of the furnace the $N_2O_5$ which may have formed is broken down to $NO_2$ and oxygen, and excess ozone is broken down to oxygen.

Although an excess of ozone has been mixed with the nitric oxide containing gases it will be seen that as the gases emerge from the furnace they will be in the same chemical state as though all of the NO has been oxidized with just enough ozone to oxidize it to $NO_2$. The hot gases are then cooled to substantially room temperature in the cooler 43 and then led by conduit 8 into the absorption cell. The $NO_2$ determination is again made as previously described. Since the increase in $NO_2$ content represents the amount of NO in the sampled gases it is a very simple matter to calculate the NO content of the gases.

Although we have described an apparatus for carrying out this modification of our process in some detail it will be understood of course that other photometric circuits may be employed. The photoelectric cells may be of either the vacuum tube type or the barrier layer type. We have shown a circuit employing two photoelectric cells but this is merely for the purpose of compensating for fluctuations in the light source and if a light of dependable uniform intensity is made available a single photoelectric cell could be employed with suitable changes in the circuit. Since photoelectric measurements of this type are well known further elaboration appears to be unnecessary. The comprehensive article "Photoelectric methods in analytical chemistry," Ralph H. Muller, Industrial & Engineering Chemistry, analytical edition, vol. 11, pages 1–17 (1939), for example, describes several suitable photometric circuits in detail.

Fig. 2 shows a method of analyzing NO and $NO_2$ containing gases automatically and continuously while at the same time recording the results. In this modification of our process we may employ a photometer of the flickering beam type, such as described in detail in the patent to Orrin W. Pineo, No. 2,107,836, dated February 8, 1938.

In this apparatus light from a suitable source 50 passes through a system of lenses 51 and a prism 52. A movable slit formed by a mirror 53 and knife edge 54 allows a substantially monochromatic beam of light to be reflected from the mirror surface through additional lenses 55 and prism 56. When using this apparatus we disconnect the knife edge and mirror assembly from the balance of the recording device as described in the Pineo patent and maintain it at a position where blue light is selected since we are not interested in varying the chromatic quality of the light beam as the recorder operates. The monochromatic beam is then caused to pass through a slit 57, a Rochon prism 58, a Wollaston prism 59 and a fllickering prism 60 mounted in the armature 61 of a synchronous motor. The resulting two beams which have been polarized at right angles to each other by the optical system pass through lenses 62. One beam passes through a reference cell 63 and the other passes through an absorption cell 64 such as previously described. The two light beams then enter an integrating sphere 65, containing a photoelectric cell 66. In a photometer of the flickering beam type the absorption of the light passing through the absorption cell is measured by the angle through which the Rochon prism 58 is turned. The angle through which the Rochon prism is turned is recorded on coordinated paper wrapped on a recording drum 67 by a stylus (not shown) connected by suitable means 68 to the Rochon control mechanism.

Various mechanical modifications in this photometer may obviously be made without departing from the spirit of our invention. For example, a light with a suitable collimating lens, slit and blue filter may be mounted in front of the photometering prism thereby avoiding the necessity of using the complex optical system described up to that point. Also, a continuous strip chart may be employed in place of a single sheet chart. Various types of cams controlling the relation between prism and pen motion may also be employed but since these have been previously described it does not appear to be necessary to describe them in detail here.

Another useful modification which enables us to record the photometric data at a point removed from the instrument comprises a rheostat coupled to the photometering prism and forming a part of a Wheatstone bridge circuit. This circuit may be used to control the pen of a standard electrically operated recording device at some distant point as, for example, the control laboratory.

The analysis of nitric oxide containing gases in this type of apparatus will now be described. A sample of gas to be analyzed for NO and $NO_2$ is drawn through a filter 70 and flow meter 71 similar to those described in conjunction with Fig. 1. A stream of air drawn through filter 72, flow meter 73, conduit 74, valve 75, ozonizer 76 and valve 77 is led into mixing chamber 79. This chamber allows us to add progressively increasing amounts of ozone to the air stream which is mixed with the nitric oxide containing gases in conduit 80. The volume of chamber 79 is large relative to the volume of the absorption cell 64.

At the start of the analytical cycle the ozonizer is not in operation and no ozone is mixed with the nitric oxide gases. The nitric oxide-air mixture in line 80 is drawn through absorption cell 64 by a pump or other means (not shown) attached to line 81. The absorption of the light passing through the absorption cell is measured by the angle at which the Rochon prism is automatically turned by the control motor 82 and is recorded by the stylus on the coordinate paper. A synchronous motor 83 turns the recording drum at a known constant speed. By simply glancing at the line traced on the graph paper by the stylus the operator is able to determine the relative concentration of the $NO_2$ in the gases passing through the absorption cell. The proportion of air mixed with the gases being analyzed must of course be reckoned with in the analysis but this is readily determined by consulting the flow meters which may be constructed so as to pass constant flows of gases in any desired proportion.

The concentration of $NO_2$ in the gaseous atmosphere having been determined, a time cycle controller 84 operating at predetermined periods of time allows a high electrical potential to be applied across the ozonizer and results in the generation of ozone in the air-gas mixture. As the amount of ozone in the air-gas mixture increases more and more of the the NO is oxidized to $NO_2$ and the color of the gaseous mixture in the absorption cell becomes darker and darker. At a point at which just enough ozone has been added to the mixture to oxidize all of the NO to $NO_2$ the color of the gases in the absorption cell will be at a maximum and the recording stylus will register on the coordinate paper this maximum value. As the amount of ozone increases further some of the $NO_2$ will be oxidized to $N_2O_5$ and the color of the gases will again decrease and may, with the generation of large quantities of ozone, become practically colorless. The recording stylus will in such case register practically no light absorption. The time cycle controller then operates to cut off the supply of electric current to the ozonizer and the amount of ozone in the air-gas mixture decreases. As less and less $NO_2$ is oxidized to $N_2O_5$ in the moving gas stream the color of the gases in the absorption cell will again become darker and again at a point at which there is just enough ozone to oxidize all of the NO to $NO_2$ absorption of light in the absorption cell will be at a maximum and will be recorded by the stylus on the coordinate paper. As the production of ozone decreases to a value of zero the color of the gases being drawn through the absorption cell will again correspond to the color of the gases being sampled and the recording stylus will register values corresponding to the $NO_2$ content of the gases. By observing the maximum color change as recorded on the coordinate paper it is a simple matter to determine the NO content of the gases from previous calibrations of the apparatus. The maximum color absorption recorded will represent of course the total $NO_2$ in the absorption cell due to the $NO_2$ originally present in the sampled gases plus the $NO_2$ formed by oxidation of NO contained in the gas. The above described cycle may then be repeated continuously or at intervals throughout any desired time and the recorded results may be preserved for future reference.

In this method of determining the NO and $NO_2$ content of the gaseous atmosphere it will be seen that as in the first described modification the NO content is determined by mixing with the gases to be analyzed a quantity of ozone sufficient to oxidize all of the NO in the gases to $NO_2$ and measuring photometrically a maximum color change of the gases as a function of the $NO_2$ content thereof.

As will be apparent from the foregoing our method of analyzing gaseous atmospheres for NO, $NO_2$, or both, may be applied under a wide variety of conditions. Our method is of greatest value, however, in chemical processes in which gases containing NO and $NO_2$ in varying proportions are employed. We may for example withdraw samples of gases in the various levels between the absorption plates of a nitric acid absorption system and control the absorption process more efficiently from the results of the analysis. By regulating the ammonia burners we may control the relative proportion of NO and $NO_2$ in any part of the absorption tower. The $NO:NO_2$ ratio may also be changed by decreasing the period of contact of the gases in the plant, by decrease in pressure or even by changing the design of the nitric acid absorption tower. We may also determine the $NO:NO_2$ ratio in the gases issuing from the nitric acid plant and may modify the ratio as desired to obtain a more efficient operation of either the nitric acid plant or of the nitrite plant which is generally associated with it. We may also employ our method in the analysis of the gases in various parts of the nitrite plant or employ it to determine the gases issuing to waste from the plant. By having a rapid analytical method of determining the NO and $NO_2$ content of the gases from these plants their efficiency may obviously be improved to an extent not heretofore obtainable.

What we claim is:

1. A method of determining the NO content of a gaseous atmosphere which comprises converting the NO in said gaseous atmosphere substantially completely to $NO_2$, and measuring photometrically the resulting maximum change in a light absorption characteristic of said gaseous atmosphere as a function of the NO content thereof.

2. A method of determining the NO and $NO_2$ content of a gaseous atmosphere which comprises measuring photometrically a light absorption characteristic of said atmosphere and expressing the content of $NO_2$ in said atmosphere as a function thereof, then oxidizing the NO in said atmosphere substantially completely to $NO_2$ and measuring photometrically the resulting maximum change in said light absorption characteristic of said atmosphere as a function of the NO content thereof.

3. A method of determining the NO content of a gaseous atmosphere which comprises progressively mixing with said atmosphere a quantity of ozone sufficient to oxidize all of the NO in the atmosphere to $NO_2$ and measuring photometrically the maximum change in a light absorption characteristic of said atmosphere during the progress of the mixing process as a function of the NO content thereof.

4. A method of determining the NO and $NO_2$ content of a gaseous atmosphere which comprises measuring photometrically a light absorption characteristic of said atmosphere and expressing the content of $NO_2$ in said atmosphere as a function thereof, then progressively mixing with said atmosphere a quantity of ozone sufficient to oxidize all of the NO in the atmosphere to $NO_2$ and measuring photometrically the maximum change in said light absorption characteristic of said atmosphere during the progress of the mixing process as a function of the NO content thereof.

5. A method of determining the NO content of a gaseous atmosphere which comprises mixing with said atmosphere a quantity of ozone at least sufficient to oxidize all of the NO in the atmosphere to $NO_2$, heating the gases to temperatures sufficiently high to reduce any $N_2O_5$ which may have formed to $NO_2$ and to destroy excess ozone, and then measuring photometrically the change in a light absorption characteristic of said atmosphere as a function of the NO content thereof.

6. A method of determining the NO and $NO_2$ content of a gaseous atmosphere which comprises measuring photometrically a light absorption characteristic of said atmosphere and expressing the content of $NO_2$ in said atmosphere as a function thereof, then mixing with said atmosphere a quantity of ozone sufficient to oxidize all of the NO in the atmosphere to $NO_2$, heating the gases to temperature sufficiently high to reduce any $N_2O_5$ which may have formed to $NO_2$ and to destroy excess ozone, and then measuring photometrically the change in said light absorption characteristic of said atmosphere as a function of the NO content thereof.

7. A method of determining the NO and $NO_2$ content of a gaseous atmosphere which comprises the steps of mixing a stream of air and a stream of the gaseous atmosphere containing NO and $NO_2$ and measuring photometrically a light absorption characteristic of said atmosphere and expressing the content of $NO_2$ in the mixed gases as a function thereof, then forming a progressively increasing quantity of ozone in said air stream in amounts sufficient to oxidize all of the NO in the mixed gaseous atmosphere to $NO_2$ while measuring photometrically the light absorption characteristics of the mixed gases and determining the maximum change in the light absorption characteristics as a function of the NO content thereof.

ROBERT H. PARK.
JAMES K. DIXON.

REFERENCES CITED

The following references are of record in the file of this patent:

UNITED STATES PATENTS

| Number | Name | Date |
|---|---|---|
| 1,400,912 | Reid | Dec. 20, 1921 |
| 1,919,858 | Pettingill | July 25, 1933 |
| 1,977,359 | Styer | Oct. 16, 1934 |

OTHER REFERENCES

Mellor, Comprehensive Treatise on Inorganic and Theoretical Chemistry, vol. 1 (1922), page 906; vol. 8 (1928), page 432.

McPherson & Henderson, A Course in General Chemistry (1915). Ginn & Co., p. 33.

Fulweiler, Analytical Methods For Determining Nitric Oxide. Gas Age, Record, June 15, 1935, pp. 586–590.